United States Patent Office 2,813,090
Patented Nov. 12, 1957

2,813,090
COAGULATION OF LIGNIN BY FREEZING

Frank J. Ball, Charleston, S. C., assignor to West Virginia Pulp and Paper Company, New York, N. Y., a corporation of Delaware No Drawing. Application March 16, 1953,
Serial No. 342,707

6 Claims. (Cl. 260—124)

This invention relates to coagulating difficultly filterable lignin sols by freezing the sol to the solid state followed by thawing to room temperature.

Lignin precipitated from aqueous alkaline solution by acids at atmospheric temperatures is obtained as a sol having particles of sizes of about or slightly beyond the colloidal state, so that filtration thereof is exceedingly slow or impossible because of plugging of the interstices of even the coarser grades of filter paper or filter cloth.

In order to effect filtration of such difficultly filterable sols, it is common practive to coagulate lignin by application of heat, for example, by heating the sol to 95° C. or 100° C. for about one minute followed by cooling to about 60° C. Heat coagulated lignin consists of spheres from 1–10 microns in diameter, these spheres often being associated in clusters. Filtration of heat coagulated lignin results in a hard-packed filter cake. Uncoagulated lignin slurry or filter cake, when dried at room temperature, produces a shiny, ebony black, brittle solid wherein the lignin particles appear to be fused together.

It is an object of this invention to coagulate precipitated lignin into particles having readily filterable properties without the application of heat.

It is a further object of this invention to produce readily filterable lignin particles by freezing lignin sols and slurries containing precipitated but difficultly filterable lignin.

It is another object of this invention to prepare lignin particles having novel physical shapes and characteristics.

It is yet another object of this invention to coagulate precipitated lignin in the absence of heat in biochemical solutions and media to effect removal of material from said biochemical solutions and media.

These and other objects of this invention will readily become apparent upon reading the following descriptive disclosure.

According to this invention, aqueous precipitated lignin sols and slurries which are difficult to filter are converted to particles having rapid filtering properties by freezing to a solid state, followed by thawing to effect liquefaction of the ice therein.

Coagulated lignin obtained by the method of freeze coagulation of this invention has substantially identical chemical properties as heat coagulated lignin obtained from the same sol or slurry, but many of its physical characteristics and properties are markedly different.

Heat coagulated lignin consists of spheres, or clusters of spheres, from 1 to 10 microns. Freeze coagulated lignin consists of particles having flat surfaces meeting to form angular edges, the particle size of which varies from 5 to 100 microns.

Heat coagulated lignin yields a tightly packed filter cake whereas freeze coagulated lignin yields a filter cake which is loosely packed. Freeze coagulated lignin is darker in color than heat coagulated lignin, and it produces a lighter colored filtrate than that of heat coagulated lignin. Dried freeze coagulated lignin is difficult to wet, but dried heat coagulated lignin is readily wetted. However, the melting point of pulverized freeze coagulated lignin is substantially identical to that of heat coagulated lignin, indicating that neither heating nor freezing during coagulation appears to affect the chemical structure of the lignin.

Freeze coagulation of lignin is useful in clarification of pharmaceutical broths where heat coagulation cannot be tolerated. Moreover, in some instances, as where calcium lignate is to be obtained, coagulation by heat at atmospheric pressure is not possible, whereas freeze coagulation of calcium lignate is readily effected.

While the theory of freeze coagulation is not fully developed, nevertheless it is believed the coagulation is effected by formation of ice particles which upon freezing out compress and possibly dehydrate the water insolbule lignin into particles having angular edges.

The following examples are presented as illustrative embodiments of this invention, and therefore they are not to be construed as limitations thereof.

*Example I*

Ten grams of Indulin B, a purified sodium lignin salt obtained by the sulfate process from southern pine, was dissolved in 390 g. of tap water by heating the mixture to 80° C. The solution was then acidified at 25° C. to a pH of 1 to 2 by the addition of 6 N sulfuric acid with stirring. The acid lignin slurry obtained was divided in four parts and put in 4 oz. screw cap bottles. One bottle was placed in a refrigerator freezer compartment at −20° C. Another bottle was placed in the body of a refrigerator held at 2° C. The third bottle was left at room temperature, and the fourth bottle was heated to 95° C. on a hot plate with stirring and then immediately cooled to room temperature.

After 20 hours the two refrigerated bottles were removed from the refrigerator. The bottle which had been at 2° C. still had the lignin suspended in the water exactly like the bottle at room temperature. On thawing the frozen lignin solution of the bottle which had been maintained at −20° C. at room temperature, the lignin immediately settled, leaving a clear water layer. The acid slurry which had been heated to 95° C. was found to be coagulated and the lignin settled to the bottom but the clear liquid was yellowish whereas the liquid obtained from the frozen and subsequently thawed slurry was clear white.

The times required to filter the different slurries through a 4.5 cm. Büchner using Arthur H. Thomas filter paper No. 5160 are given below:

| Coagulation Conditions | Filtering time for 100 ml. of slurry in 4.5 cm. Buchner, Seconds |
| --- | --- |
| None | >3,600 |
| Heated to 95° C. then cooled | 80 |
| Frozen at −20° C. for 20 hrs., then thawed | 20 |
| Cooled to 2° C. for 20 hrs | >3,600 |

The above example was repeated with another commercially available lignin, known as Indulin A, a lignin obtained by acidification with a mineral acid of a lignin salt precipitated from carbon dioxide treated sulfate process black liquor derived from southern pine wood. Substantially the same results were obtained.

*Example II*

A 5% alkaline Meadol MRM solution was prepared by dissolving 10.0 g. of Meadol MRM, a lignin obtained by the soda process, in 190 ml. of 80° C. water containing 0.95 g. of sodium hydroxide. Upon cooling, the solution was acidified to a pH of 2 with sulfuric acid in order to precipitate the lignin therein.

Forty milliliters of the slurry was filtered on a 4.5 cm. Büchner funnel and then washed with water. The time of filtration was noted and the weight of the wet cake was determined both before and after overnight drying in an oven at 105° C.

Sixty milliliters of the slurry was heated to 95° C. on a hot plate with manual stirring and then cooled to 25° C. Forty milliliters of the resulting coagulated slurry was filtered in the 4.5 cm. Büchner and the time required for filtration and the percent of solids in the filter cake were determined.

A 100 ml. sample of the acid slurry was frozen by maintaining a temperature of —20° C. for 20 hours, and was then thawed at room temperature. Forty milliliters of the freeze coagulated slurry was filtered in the 4.5 cm. Büchner and both the filtration time and the percent of solids of the filter cake were determined. The results were as follows:

| Coagulation Conditions | Filter Cake Solids, Percent | Filtration time for 40 ml. of slurry in 4.5 cm. Buchner, Seconds |
| --- | --- | --- |
| None | 9.1 | 900 |
| Heated to 95 C., then cooled | 57 | 12 |
| Frozen at —20° C. for 20 hrs., then thawed | 49 | 9 |

Example III

Twenty grams of Indulin A above mentioned was dissolved with 0.95 g. of sodium hydroxide in 380 ml. of water by heating to boiling. A 5% monosodium lignin solution was obtained which was then treated with a solution of 3.5 g. of calcium chloride dihydrate dissolved in 10 ml. of water. This treatment completely precipitated the lignin as the calcium salt.

Forty milliliters of this slurry was added to a 4.5 cm. Büchner funnel. It immediately clogged the filter paper.

Next, 100 ml. of this slurry was heated to boiling with stirring on a hot plate. The slurry was held at the boiling point for one minute, and then cooled to room temperature. Forty milliliters was then filtered on a 4.5 cm. Büchner and washed. The time of filtration was noted and the percent solids of the filter cake determined by drying to bone dryness at 105° C.

Next, 100 ml. of this slurry was frozen at —20° C. in the freezer for 20 hours and then thawed at room temperature. Forty milliliters of the resulting freeze coagulated slurry was filtered on the 4.5 cm. Büchner and the filtration time and the percent solids of this filter cake were determined.

One hundred milliliters of this slurry was then heated to boiling for one minute, then cooled and finally frozen for 20 hours at —20° C. The frozen slurry was then thawed at room temperature, and 40 ml. thereof was filtered on a 4.5 cm. Büchner. The filtration time and percent solids of this filter cake were determined and are given below:

| Coagulation Conditions | Filter Cake Solids | Filtration Time for 40 ml. in 4.5 cm. Buchner, Seconds |
| --- | --- | --- |
| Slurry boiled for 1 min., then cooled | 17 | 300 |
| Slurry frozen at —20° C. for 20 hrs., then thawed | 43 | 5 |
| Slurry boiled for 1 min. then frozen at —20° C. for 20 hrs. then thawed | 19 | [1] 90 |

[1] Only 25 ml. of slurry used instead of 40 ml.

It is thus apparent that freezing a calcium lignate slurry is more effective in coagulating the lignin salt than boiling for short periods.

It is noted that with a slurry that is boiled and partially coagulated, the freeze coagulation thereof is not nearly as effective as when freeze coagulation is applied to the uncoagulated slurry. The filter cake from the freeze coagulation contained only angular chunks of material, while that material obtained from the heat coagulation followed by freeze coagulation, contained a few angular chunks of material, but mainly it contained many small spheres. Apparently once calcium lignate has been coagulated by heating, it is no longer capable of being coagulated by freezing.

Example IV

A sample of oxidized Indulin A which was 89% insoluble in acetone was dissolved in alkali to a 10% solution. The solution was acidified at room temperature to a pH of 2 and then frozen overnight at —20 C. Upon thawing at room temperature, it was found that the freeze coagulated oxidized Indulin A had been well coagulated and filtered rapidly. Oxidized lignins are known to be more difficult to coagulate by heating than unoxidized lignin.

From the foregoing examples, it will be seen that lignin which has been precipitated from an aqueous alkaline solution by acidification to a pH of 2 or somewhat above, e. g., from 2 to 4 or by the formation of a water insoluble salt, such as the calcium salt, may be coagulated by freezing the aqueous slurry of the lignin salt. This manner of coagulation has been contrasted with that heretofore used involving heating the lignin slurry. In general the yields are approximately the same. As will be seen from Example I, the filtering time for the freeze coagulated lignin is substantially faster than obtains for the lignin coagulated by heat. Also where a lignin has been filtered without previous coagulation— a very slow operation—the filter cake so obtained, if frozen at —20° C. and thereafter thawed, will be found to consist of lignin particles of the same type as obtained in the various examples above given and therefore one which will filter rapidly. In so proceeding, it was found that from 80 to more than 90% of the water from the uncoagulated lignin cake was removed by the operations of freezing, thawing and refiltering. It was sought to prepare such lignin by freezing ordinary carbonated black liquor, i. e., of a pH of 9.75. However, the freezing operation failed to produce coagulation, apparently because the large amount of salt in the liquor causes some of the brine containing the lignin to remain unfrozen.

This invention may usefully be applied to clarifying heat sensitive pharmaceutical solutions by dissolving lignin therein, acidifying the lignin solution, freezing the acidified solution to a solid, thawing the frozen solid to free the coagulated lignin, and filtering off the coagulated lignin along with any entrained or adsorbed material associated therewith.

This invention has been illustrated by several examples, but it is not to be limited thereto.

I claim:

1. The method of preparing readily filterable lignin comprising acidifying an alkaline solution containing dissolved lignin to precipitate the dissolved lignin, freezing the acidified solution containing the precipitated lignin to a solid state to effect coagulation of the formed lignin particles, and thawing the solid to produce a slurry containing readily filterable lignin particles.

2. The method of claim 1 comprising acidifying to produce a pH of from about 1 to about 4, and freezing to produce particles having angular edges.

3. The method of coagulating aqueous slurries of water insoluble lignin salts, comprising freezing a quantity of such slurry to a completely solid state to effect coagulation of the lignin salts, and thawing the solid to produce a slurry containing readily filterable lignin particles.

4. The method of coagulating colloidal aqueous suspensions of lignin particles in insoluble form, comprising freezing a quantity of such suspension to a completely solid state to effect coagulation of the lignin particles, and thawing the solid to produce a slurry containing readily filterable lignin particles.

5. The method according to claim 4 in which the colloidal lignin is in the acid form.

6. The method according to claim 4 in which the colloidal lignin is in the form of its calcium salt.

References Cited in the file of this patent

UNITED STATES PATENTS

| | | |
|---|---|---|
| 2,200,784 | Wallace | May 14, 1940 |
| 2,280,600 | Muller | Apr. 21, 1942 |
| 2,415,439 | Nelson | Feb. 11, 1947 |

OTHER REFERENCES

Brauns: "The Chemistry of Lignin," 1952, Academic Press Inc., pages 58 and 59.